W. H. STEWART.
Bung and Stopper for Cask.
No. 220,773.    Patented Oct. 21, 1879.
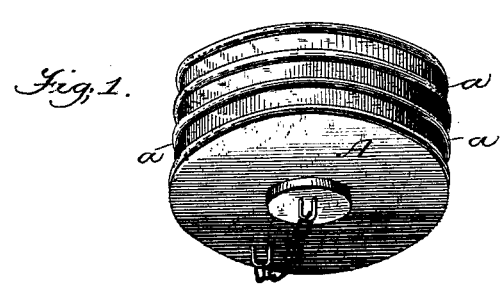
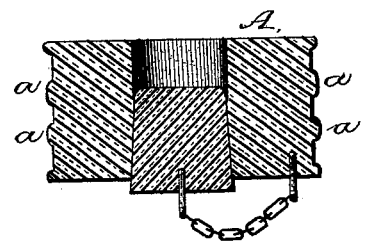
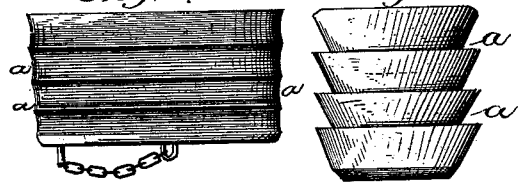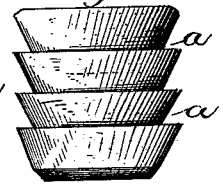
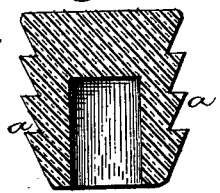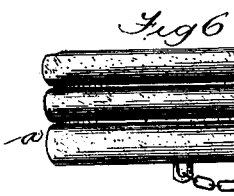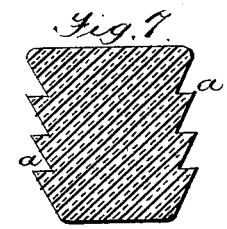

UNITED STATES PATENT OFFICE.

WILLIAM H. STEWART, OF BROOKLYN, NEW YORK.

IMPROVEMENT IN BUNGS AND STOPPERS FOR CASKS.

Specification forming part of Letters Patent No. 220,773, dated October 21, 1879; application filed September 19, 1879.

*To all whom it may concern:*

Be it known that I, WILLIAM H. STEWART, of the city of Brooklyn, county of Kings, and State of New York, have invented a new and useful Improvement in Bungs and Stoppers for Lager-Beer and Ale Casks or Kegs; and I hereby declare the following to be a clear, full, and exact description thereof, reference being had to the accompanying drawings, making a part of this specification, in which—

Figure 1 is a perspective of my improved bung or stopper. Fig. 2 is a longitudinal sectional view of the same. Fig. 3 is a sectional view of a stopper made as shown in Fig. 5, and having an opening partially through it. Figs. 4, 5, 6 show modifications in the form of corrugations. Fig. 7 is a vertical section of Fig. 5.

My invention relates to bungs and stoppers for faucet-holes in lager-beer and ale casks and kegs; and it consists in the exterior form of the bung or stopper, whereby it is adapted to be more easily driven into the cask or withdrawn therefrom when desired.

Heretofore such stoppers made of wood or cork are objectionable, for the reason that the gases readily penetrate the pores of such materials and leave the beer or ale unfit for use in consequence of becoming flat or stale. The wood and cork will become saturated with the liquid, and after being once used will become sour and injuriously affect the beer.

In the use of the elastic bung or stopper I find that great difficulty exists in extracting it in the form in which it has heretofore been made from the aperture in the cask or vessel, on account of the adhesive properties of the rubber, and this especially is the case when using it for lager-beer or ale casks, where the aperture is wood or iron bound. If the bung or stopper is made very hard, or even hard enough to drive easily in the aperture, there is no certainty that the aperture will be perfectly sealed, as the harder the composition the less the elasticity, and the less the certainty of its filling any irregularities that may exist in the aperture. On the contrary, if the composition be made softer to gain more elasticity, then the difficulty of driving in the bung or stopper occurs, as the composition sticks and adheres to the sides of the aperture, and after being once driven in is very difficult to extract.

The special object of my invention is to overcome these several difficulties by making a bung or stopper which can be readily driven in or extracted, and which will also perfectly seal the aperture in the cask.

To enable others skilled in the art to make and use my improved bung or stopper, I will proceed to describe the exact manner in which I have carried it out.

In the drawings, A represents my bung formed with its circumferential surface ribbed or corrugated, as shown at *a a*. These ribs or corrugations are formed around the bung at a right angle with its axis. By this construction the center or body of the bung or stopper may be comparatively rigid or inflexible, while the surface or bearing parts will be elastic.

The corrugations may be made of a depth to suit the purpose for which the bung or stopper is intended. When intended for stopping faucet-holes in lager-beer or ale casks it is advisable to make the corrugations quite deep, that the elevations may be more elastic and flexible, so as to fit different-sized holes, and thus allow for the wearing away or enlarging the holes by the frequent driving in of the faucet.

In using the bung or stopper for faucet-holes it is customary to drive the bung or stopper through into the cask by placing the faucet against it and striking the faucet with a mallet. I therefore prefer for such purpose the corrugations shaped as shown at *a* in Fig. 3, as this shape not only facilitates the driving of the stopper into the cask, but the sharp edges of corrugations have a tendency to prevent the stopper from being blown out by the pressure of the liquids or gases.

As I find it desirable to vary the corrugations to suit the different purposes for which the bung or stopper is adapted, I do not limit my invention to any particular form of rib, the essential feature of it being in the irregular circumferential surface of the bung or stopper as distinguished from the plane surface heretofore used; and the bung or stopper may be made solid, or with an aperture running longitudinally through its center, with a plug fitted therein, or with an aperture running partially through it, so as to reduce the materials used and lessen the cost of construction without departing from the principle of my invention.

Having thus explained my invention, what I claim as new, and desire to secure by Letters Patent, is—

As an improved article of manufacture, the elastic bung or stopper A, provided with the ribs or corrugations $a$ $a$, substantially as and for the purpose set forth.

WILLIAM H. STEWART.

Witnesses:
   T. NEW,
   N. DUFF.